US011532171B1

United States Patent
Ranade et al.

(10) Patent No.: US 11,532,171 B1
(45) Date of Patent: Dec. 20, 2022

(54) REPRESENTATION LEARNING USING MACHINE LEARNING CLASSIFICATION TASKS BASED ON POINT CLOUDS OF INTERACTING 3D SURFACES

(71) Applicant: ANSYS, INC., Canonsburg, PA (US)

(72) Inventors: Rishikesh Ranade, Bridgeville, PA (US); Jay Pathak, Pleasanton, CA (US)

(73) Assignee: ANSYS, INC., Canonsburg, PA (US)

( * ) Notice: Subject to any disclaimer, the term of this patent is extended or adjusted under 35 U.S.C. 154(b) by 96 days.

(21) Appl. No.: 17/062,528

(22) Filed: Oct. 2, 2020

(51) Int. Cl.
  *G06V 20/64* (2022.01)
  *G06K 9/62* (2022.01)

(52) U.S. Cl.
  CPC .............. *G06V 20/64* (2022.01); *G06K 9/628* (2013.01); *G06K 9/6256* (2013.01)

(58) Field of Classification Search
  None
  See application file for complete search history.

(56) References Cited

U.S. PATENT DOCUMENTS 8,553,989 B1 * 10/2013 Owechko ............... G06V 10/25
382/154

* cited by examiner

*Primary Examiner* — Leon Flores
(74) *Attorney, Agent, or Firm* — Womble Bond Dickinson (US) LLP

(57) ABSTRACT

A method and apparatus for determining spatial characteristics of three-dimensional objects is described. In an exemplary embodiment, the device receives a point cloud representation of a three-dimensional surface structure of a plurality of objects. The device may further generate a set of bins to represent the three-dimensional surface structure based on the point cloud representation, each bin corresponding to a spatial occupancy related to the point cloud representation, each bin including a respective type indicating a spatial relationship of the surface structures and a corresponding spatial occupancy of the bin. In addition, the device may encode the set of bins using a convolutional neural network. The device may further determine a classification for the spatial characteristic of the surface structures based on the convolutional neural network with the encoded set of bins.

20 Claims, 11 Drawing Sheets
(8 of 11 Drawing Sheet(s) Filed in Color)

| | | Score |
|---|---|---|
| Ground truth label | Bad | |
| Classification label | Bad | 1e-8 |

Red = target, blue = contact

|  |  | Score |
|---|---|---|
| Ground truth label | Review |  |
| Classification label | Review | 48.55 |

US 11,532,171 B1

REPRESENTATION LEARNING USING MACHINE LEARNING CLASSIFICATION TASKS BASED ON POINT CLOUDS OF INTERACTING 3D SURFACES

FIELD OF INVENTION

This invention relates generally to interacting three—dimensional surfaces and more particularly to characterizing the interaction of the three—dimensional surfaces using a machine learning system.

BACKGROUND OF THE INVENTION

Many applications, such as mechanical contacts, involve classification tasks to determine the quality of contacts based on features extracted from interaction between two or more three— dimensional (3D) surfaces or edges. The features representing interactions between 3D surfaces could range from proximity and overlap between 3D surfaces to more complicated interactions, such as a solid angle between these 3D surfaces. However, it can be difficult and time consuming to compute such features from 3D surface representations. For example, companies can spend days to detect mechanical contacts between surfaces of three-dimensional geometries and estimate their quality.

In one approach, point clouds can provide an elaborate, unstructured representation of the 3D surfaces. A point cloud is a set of data used to represent a 3D object in space. Recently developed point cloud technologies, such as PointNet and PointNet++ can extract features from point clouds. These point clouds, however, do not explicitly or implicitly capture the interaction between the different surfaces of the geometry for two or more 3D objects.

SUMMARY OF THE DESCRIPTION

A method and apparatus for determining spatial characteristics of three-dimensional objects is described. In an exemplary embodiment, the device receives a point cloud representation of a three-dimensional surface structure of a plurality of objects. The device may further generate a set of bins to represent the three-dimensional surface structure based on the point cloud representation, each bin corresponding to a spatial occupancy related to the point cloud representation, each bin including a respective type indicating a spatial relationship of the surface structures and a corresponding spatial occupancy of the bin. In addition, the device may encode the set of bins using a convolutional neural network. The device may further determine a classification for the spatial characteristic of the surface structures based on the convolutional neural network with the encoded set of bins.

Other methods and apparatuses are also described.

BRIEF DESCRIPTION OF THE DRAWINGS

The present invention is illustrated by way of example and not limitation in the figures of the accompanying drawings in which like references indicate similar elements. The patent or application file contains at least one drawing executed in color. Copies of this patent or patent application publication with color drawing(s) will be provided by the Office upon request and payment of the necessary fee.

DETAILED DESCRIPTION

Figure 1:
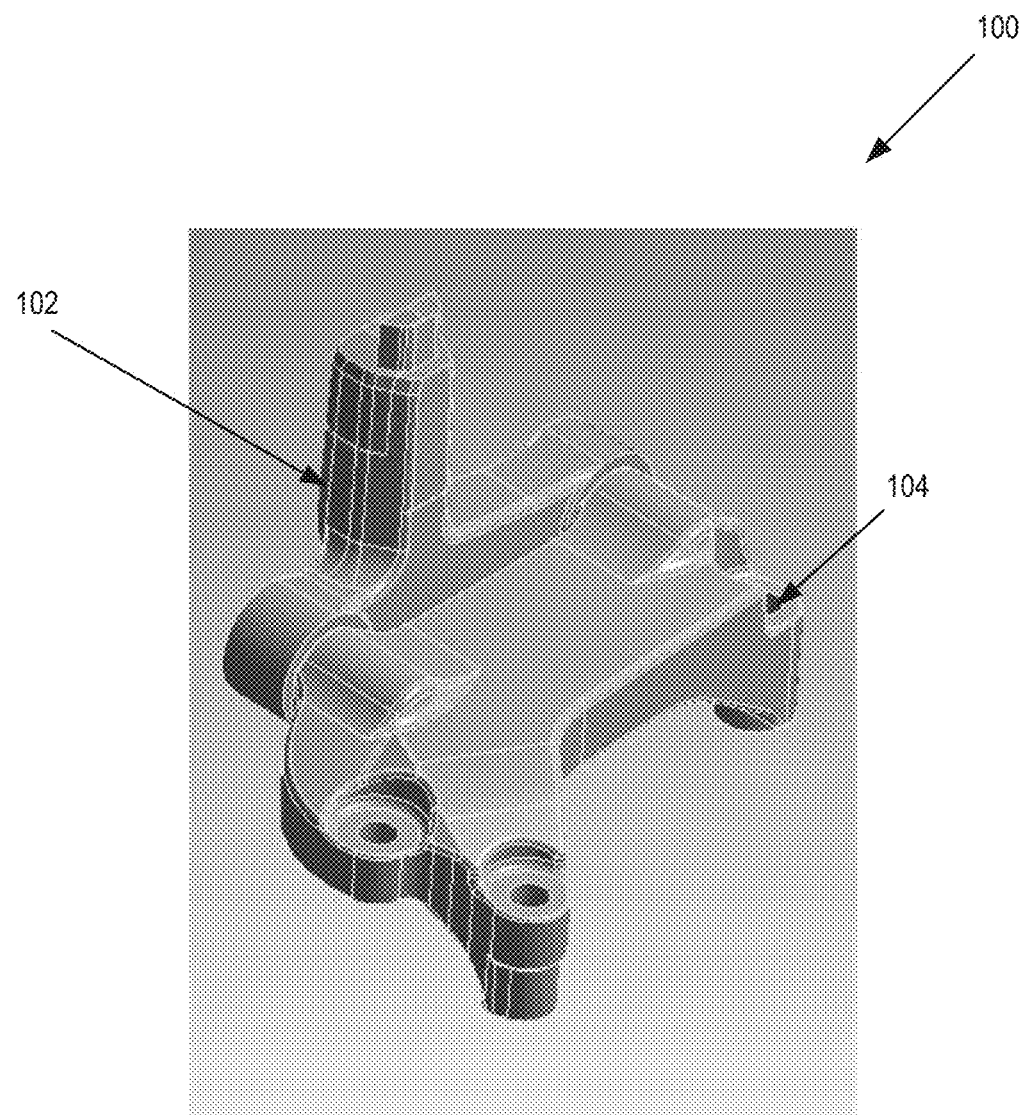
FIG. 1 is an illustration of one embodiment of a system that includes multiple interacting three-dimensional objects.

A method and apparatus for determining spatial characteristics of three-dimensional objects is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus for determining spatial characteristics of three-dimensional objects is described. Many applications, such as mechanical contacts, involve classification tasks to determine the quality of contacts based on features extracted from interaction between two or more three—dimensional (3D) surfaces or edges. The features representing interactions between 3D surfaces could range from proximity and overlap between 3D surfaces to more complicated interactions, such as a solid angle between these 3D surfaces. However, it can be difficult and time consuming to compute such features from 3D surface representations. For example, companies can spend days to detect mechanical contacts between surfaces of three-dimensional geometries and estimate their quality.

In one approach, point clouds can provide an elaborate, unstructured representation of the 3D surfaces. A point cloud is a set of data used to represent a 3D object in space. Recently developed point cloud technologies, such as PointNet and PointNet++ can extract features from point clouds. These point clouds, however, do not explicitly or implicitly capture the interaction between the different surfaces of the geometry for two or more 3D objects.

In one embodiment, a default behavior of the classification of mechanical contacts can be improved by introducing a machine learning classification system to predict the quality of auto-detected surfaces. In one embodiment, the machine learning system uses the results of an auto-contact detection so as to predict the quality of interactions between 3D surfaces. The machine learning system can identify both good and bad contacts based on activation states constructed from point cloud representations of 3D surfaces. The machine learning system can work within the visible bounds of the point cloud representation and also generalizes to assemblies which are not readily visible. This is because the machine learning system is not learning how to fit the data but instead it is learning the interaction of the contacting surfaces with strong generalizations.

In one embodiment, representation learning is the idea of using machine learning algorithms for implicitly extracting relevant features from raw data and using these features for classification tasks. Extraction of features from interacting point clouds can be non-trivial because a point cloud representation of different surfaces in a geometry may require significantly different number of points in the cloud. For example: A larger surface may require many points as compared to a smaller surface to maintain the same resolution. A problem can occur when the two point clouds have different number of points.

In addition, sampling strategies can be used to extract same number of points from different surfaces, but the number of sampled points are limited by the surface with smallest number of points. Sampling strategies can hamper representation of large parts (especially when number of sampled points is small). The machine learning system can utilize point clouds of different sizes and implicitly extract features from interacting 3D surfaces for performing classification-based tasks.

FIG. 1 is an illustration of one embodiment of a system 100 that includes multiple interacting three-dimensional objects. In FIG. 1, two 3D objects 102 and 104 are interacting on part of the surfaces of these objects. In this embodiment, a bottom side surface of object 102 may have good overlap with a side surface of the other object 104. As mentioned above, it is difficult and time consuming to compute such features from 3D surface representations from point cloud representations of these objects. For example, companies can spend days of the auto-detected contacts to rectify their quality manually. In this example, objects 102 and 104 may not a have flat surface that can be used to maximum contact. Alternatively, the contours of one of the objects 102 or 104 may not be conducive to good overlap.

In one embodiment, point clouds can be used to represent a surface of 3D object, such as objects 102 or 104. In this embodiment, a point cloud for a 3D object is a set of data points in 3D space that represents the surface of that object. If the 3D object was the result of 3D modeling, the point cloud for that object can be derived from the 3D model of that object. Extraction of features from interacting point clouds can be non-trivial because a point cloud representation of different surfaces in a geometry may require significantly different number of points in the cloud. For example, a larger surface may require many points as compared to a smaller surface to maintain the same resolution. A problem can occur when the two point clouds have different sets of points.

As described above, sampling strategies can be used to extract same number of points from different surfaces, but the number of sampled points are limited by the surface with smallest number of points.

Figure 2:
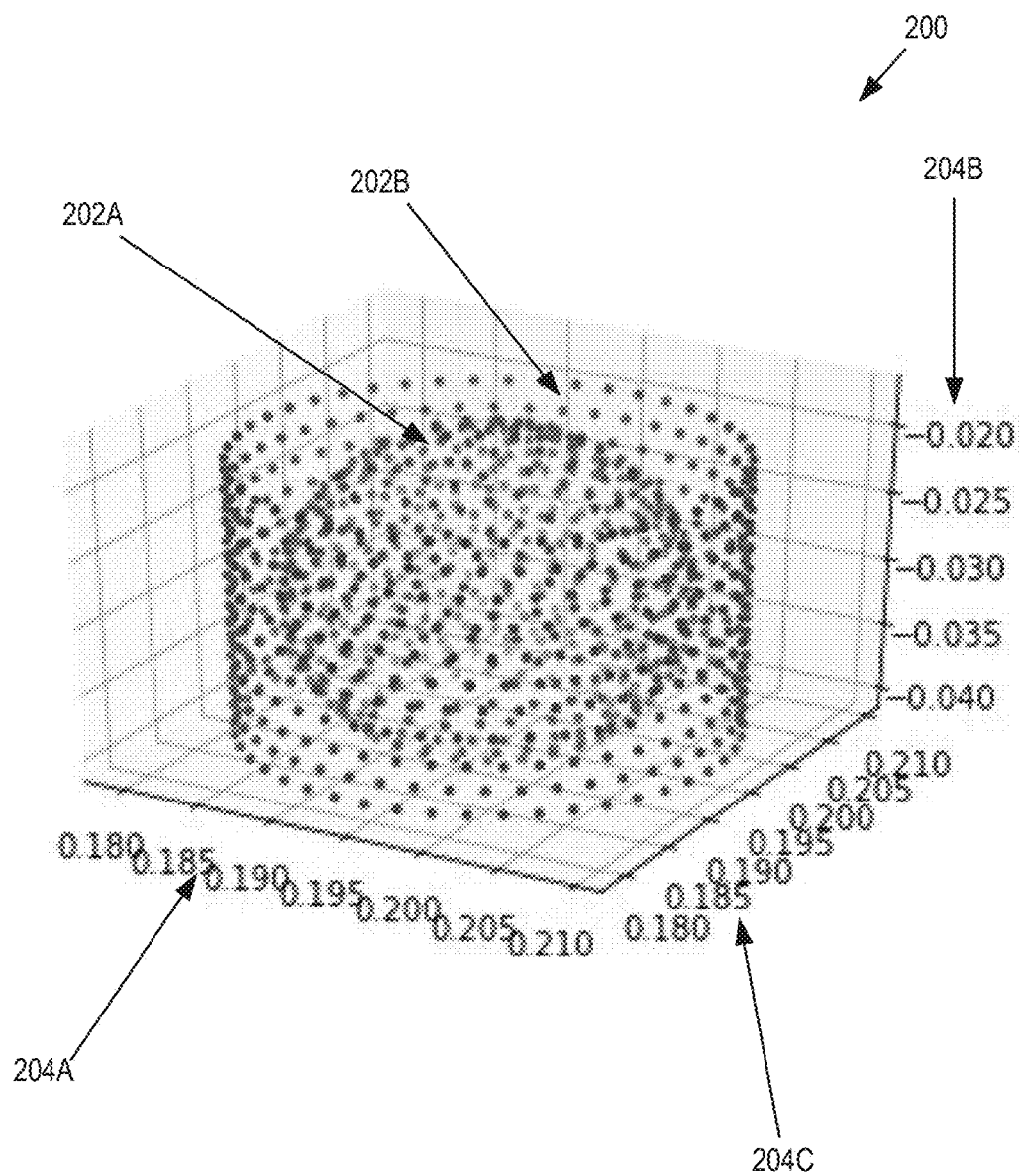
FIG. 2 is an illustration of one embodiment of a system of interacting point clouds.

FIG. 2 is an illustration of one embodiment of a system 200 of interacting point clouds. As illustrated in FIG. 2, the system 200 includes two different point clouds 202A-B, which can represent two different 3D objects. In one embodiment, point cloud 202A can represent a cylindrical tube, while point cloud 202B can be a sphere. In addition, each of the point clouds 202A-B are mapped onto a 3D grid that include axis X 204A, Y 204B, and Z 204C. In one embodiment, the point cloud 202B is inside the point cloud 202A. In one embodiment, the point clouds 202A-B may have the same number of points or may a different number of points.

Figure 3:
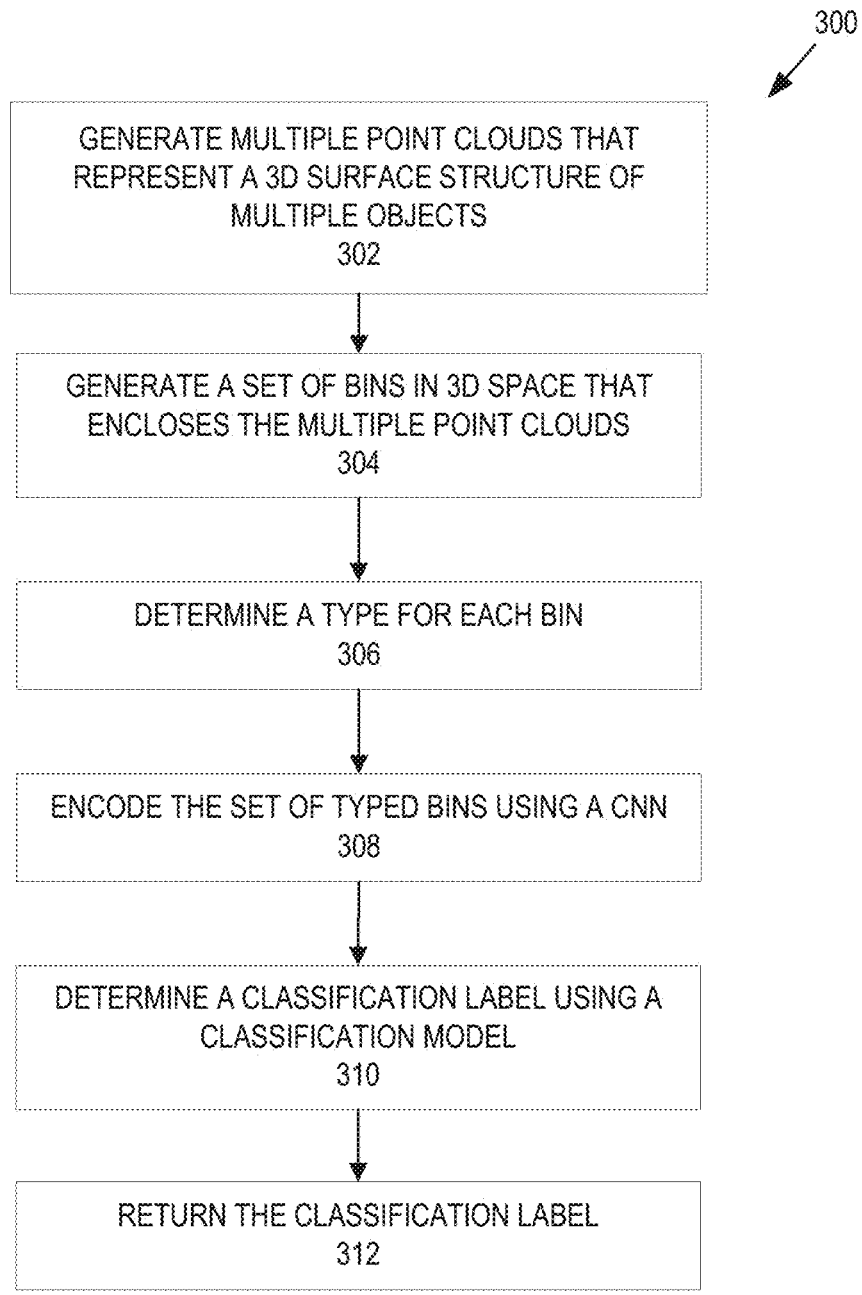
FIG. 3 is a flow diagram of one embodiment of a process to classify a set of point clouds.

In one embodiment, with the generated point clouds, the machine learning system can be performed to determine the quality of interaction between the surfaces of two or more 3D objects. FIG. 3 is a flow diagram of one embodiment of a process 300 to classify a set of point clouds. In one embodiment, In FIG. 3, process 300 begins by generating multiple points clouds that represent a 3D surface structure of multiple objects at block 302. While in one embodiment, the number of point clouds is illustrated as two, in alternate embodiments, there can be three or more point clouds. In one embodiment, each of the 3D objects can have a corresponding point cloud. In alternate embodiments, a point cloud can include more than one 3D object. Furthermore, there can be two or more points clouds that can represent two or more interacting 3D objects. At block 304, process 300 generates a set of bins in 3D space that encloses the multiple point clouds. In one embodiment, process 300 generates a set of bins at different resolutions using a multi-dimensional binning approach. In one embodiment, process 300 can create bins numbering $(n)^3$, $(n/2)^3$, and $(n/4)^3$, where n is based on the compute resources used by process 300. In this embodiment, by having bins at different resolutions, process 300 can capture both fine and coarse structures of the interacting 3D geometries. While in one embodiment, each of the bins is a cube, in alternate embodiments, the bin can be a type of shape (e.g., rectangular box, etc.). In one embodiment, a bin is a 3D space used to sub-divide the 3D space that encloses or overlaps with the space represented by the point cloud representation. In this embodiment, process 300 can determine a type for each bin based on an occupation from one or more point clouds representing the one or more 3D objects. In one embodiment, this subdivision of the larger 3D space into bins can be called data binning and a property of each bin is the type. While in one embodiment, the space that represents the point clouds encloses the points clouds, in alternate embodiments, the space is a sub-volume of the point clouds.

At block 306, process 300 determines a type for each bin. In one embodiment, process 300 determines a type based on an occupation from one or more point clouds representing one or more 3D objects. For example and in one embodiment, for a two 3D object system, there are two point clouds A and B. Each of the bins can have the possibility of having one or more points from point cloud A, one or more point from cloud B, two or more points from point clouds A and B, or no points from either point cloud. In this example, process 300 could assign a label to each of the bins based on this type of occupancy. In a further example, the label could be 1 for a bin with just one or more points from point cloud A, 2 for a bin with just one or more points from point cloud B, 3 for a bin with one or more points from each of points clouds A and B, and 0 for a bin with no points from either point cloud. In another embodiment, for three surfaces (and point clouds), the activated bins for the three surfaces and their interactions can be labeled differently. For example, and in one embodiment, for interactions of three surfaces, the number of different activated bins will increase. Process 300 can label the bins differently, e.g., points of surface 1 as 1, points of surface 2 as 2, points of surface 3 as 3, surfaces 1 and 2 as 4, surfaces 2 and 3 as 5, etc. In one embodiment, these typed bins provide an implicit representation of the proximity, overlap, and/or angle between the different surfaces of the 3D objects. In one embodiment, bins that are labeled 3 represent the overlapping regions of the 3-D surfaces. The number of such bins give an indication of the extent of overlap. Additionally, other bins can provide an indication of how many bins exist between the surfaces (representing distance and angle)

With the labels for each of the typed bins, process 300 can encode the bins based on the labels at block 308. At block 310, process 300 determines a classification using a classification model. In one embodiment, the classification model takes as input the encoded bins and outputs a classification label (e.g., a score between 0-100 or some other type of score). This score can be further classified into good contact, bad contact, or neutral/review. For example and in one embodiment, for a score ranging from 0-100, a score >80 can be good contact, a score <20 is bad contact, and score in between is neutral or needs further review. Thus, process 300 can reduce the set of possible arrangements of 3D objects that need to be manually reviewed by a user to determine if the 3D objects have good or bad overlap. Process 300 returns the classification label at block 312.

Figure 4:
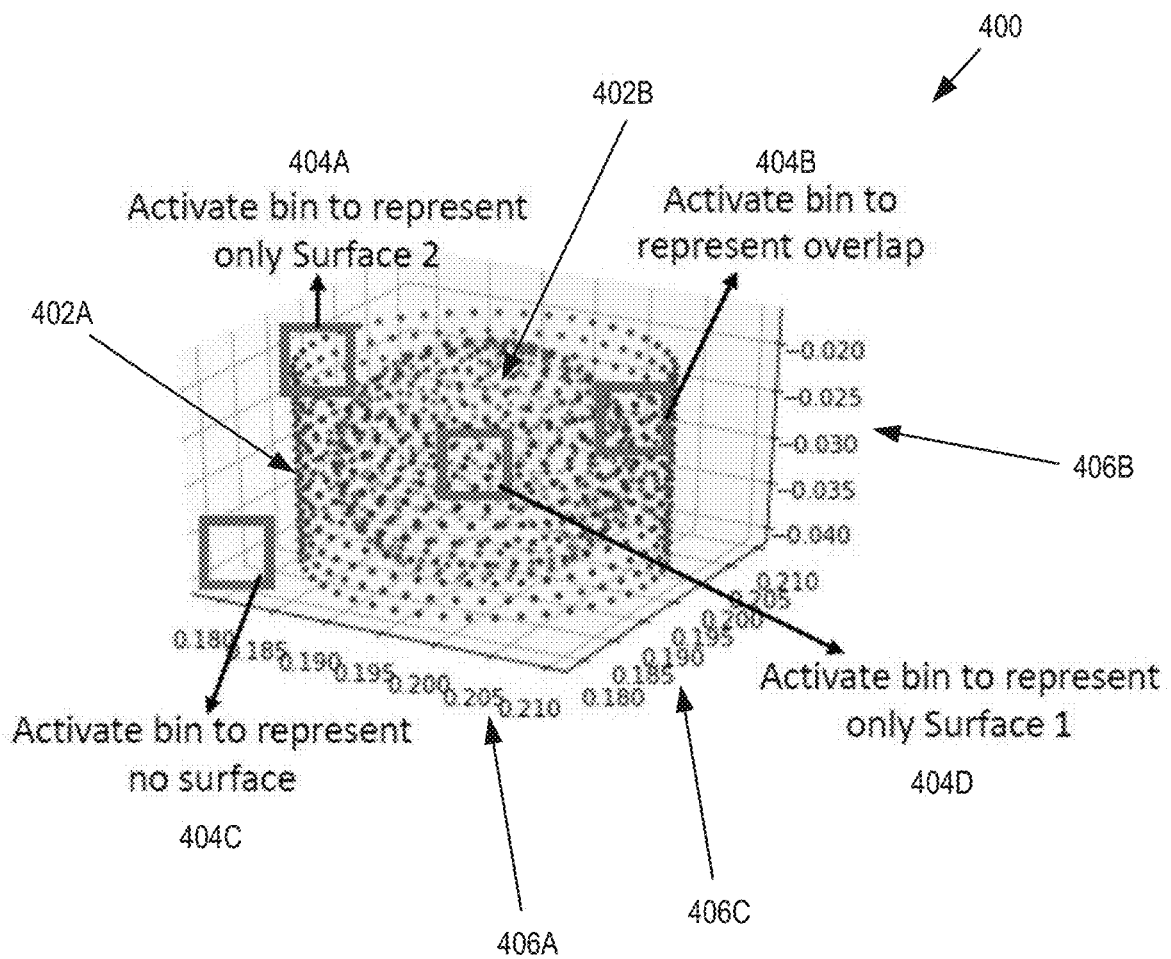
FIG. 4 is an illustration of one embodiment of a 3D space of interacting point clouds that include the set of typed bins.

FIG. 4 is an illustration of one embodiment of a 3D space 400 of interacting point clouds that include the set of typed bins. In FIG. 4, the system 400 includes a pair of point clouds 402A-B mapped onto a three-dimensional space using x, y, and z-dimensions 406A-C. In one embodiment, point cloud 402A is a tube with a surface on the inside and outside of the tube. In addition, point cloud 402B is a spherical point cloud that is inside the tubular point cloud 402A. Furthermore, within this 3D space 400, multiple bins can be constructed that include one, some, or no numbers of points from either point cloud 402A-B. In one embodiment, there are four representative bins 404A-D illustrated in FIG. 4. In FIG. 4, bin 404A includes one or more points just from point cloud 402A. In one embodiment, this bin 404A can be typed to indicate that the bins only include one or more points from point cloud 404A. In addition, bin 404B includes points from both point clouds 404A-B and can be typed as such. Furthermore, bin 404C is a bin that include one or more points from just point cloud 402B and this bin 404C can be typed to indicate this occupancy. Lastly, bin 404D does not include any points from either bin 402A-B and can be typed as such.

Figure 5:
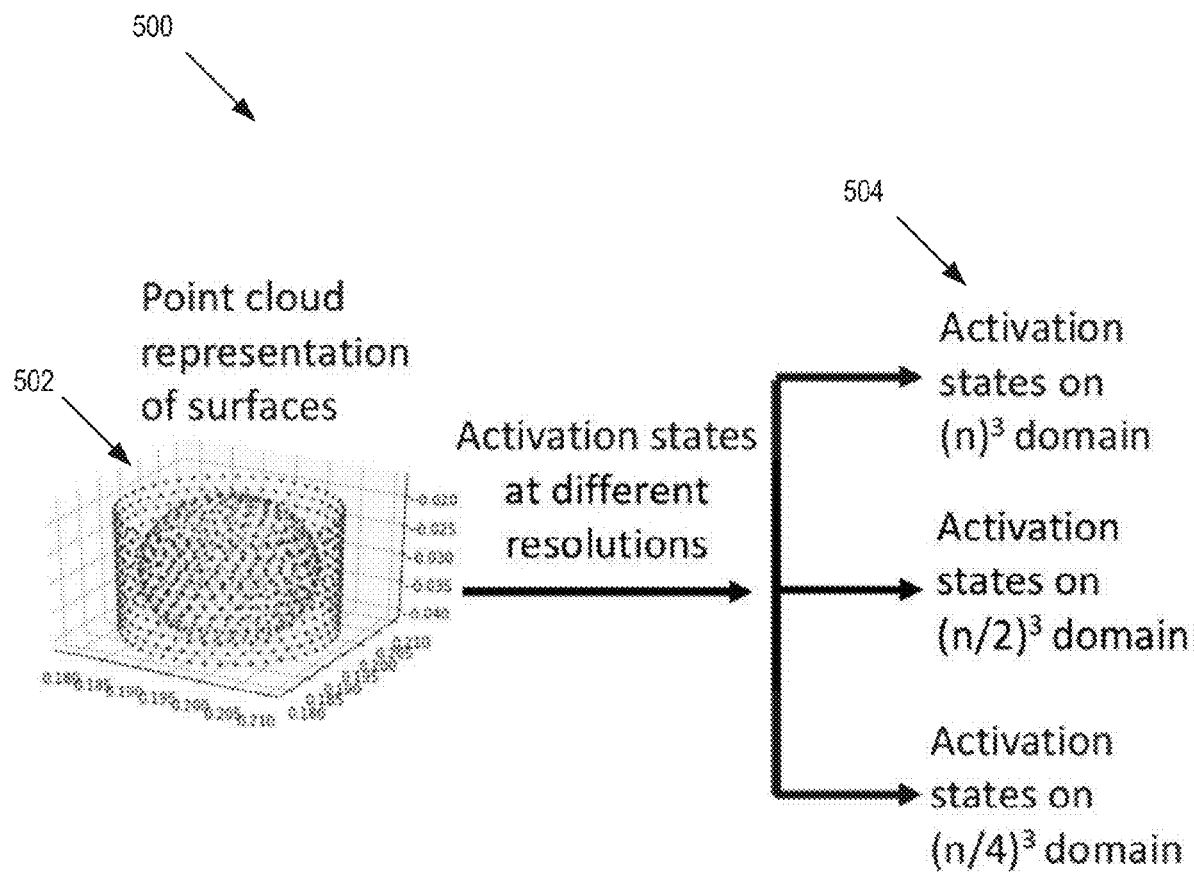
FIG. 5 is a flow diagram of one embodiment of an illustration of generating bins at different resolutions.

As described above, the bins can be generated at different levels of resolution. For example, a set of bins can be generated that are small, where this set of bins can be used to capture fine details of the interacting surfaces of the 3D objects. In another example, a set of larger bins can be used to capture coarser details of the interacting surfaces of the 3D objects. In one embodiment, the number of bins generated is dependent on the physical resources of the computing device (e.g., memory, storage, processing resources, and/or a combination thereof). FIG. 5 is a flow diagram of one embodiment of an illustration 500 of generating bins at different resolutions. In FIG. 5, the illustration 500 includes a point cloud representation of surfaces of interacting 3D objects 502. The point cloud representation 502 includes point clouds for a similar set interacting 3D objects as illustrated in FIG. 4 above, that includes a point cloud for a tubular object and a point cloud for a spherical object. In one embodiment, the system creates multiple bins 504 that partition the 3D space that encloses or overlaps with the point clouds in this representation. While in one embodiment, each of the bins is a cube, in alternate embodiments, the bin can be a type of shape (e.g., rectangular box, etc.). In addition, the system creates the bins at different resolution. In one embodiment, the system creates cube shaped bins numbering $(n)^3$, $(n/2)^3$, and $(n/4)^3$. In one embodiment, an activated state is a property of the bin. A bin on the other hand is a collection of points in given spatial bounds. The system tags each bin based on the type of points present inside it. For example: A bin with points from surface 1 is tagged as '1', surface 2 as '2', and/or labels as outlined above.

Figure 6:
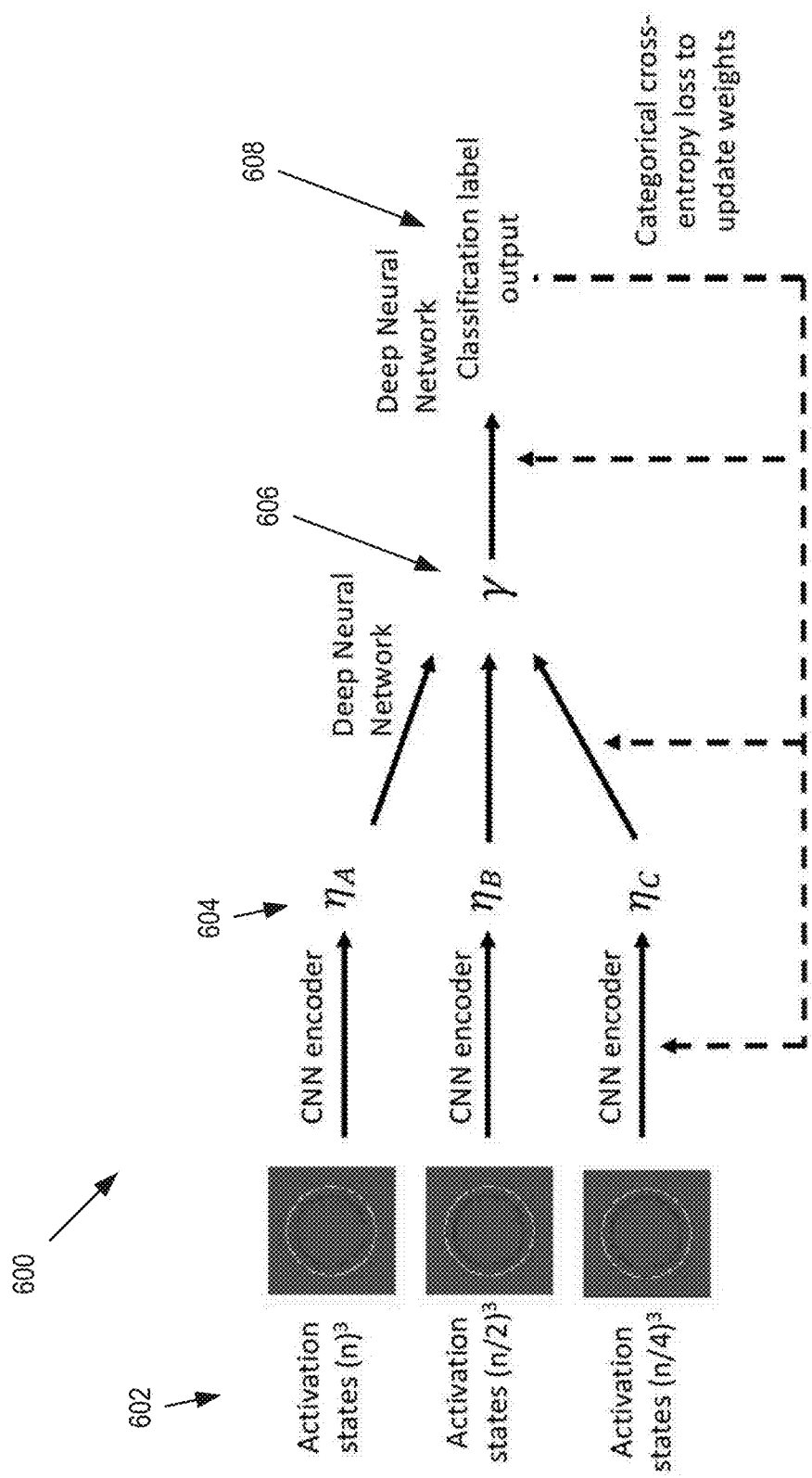
FIG. 6 is an illustration of one embodiment of a system of interacting point clouds that include the set of typed bins.

FIG. 6 is an illustration of one embodiment of a system 600 takes a set of activations states and determines a classification label output using a convolutional neural network. In FIG. 6, the system 600 receives sets of activated states, where the activated states have different sizes, based on the which set of bins the activated states are part of. For example and in one embodiment, the activated states can have the sizes based on the number of bins, such as $(n)^3$, $(n/2)^3$, and $(n/4)^3$. In one embodiment, n is based on the amount of memory available for the calculation (e.g., amount of Graphics Processing Unit (GPU) is available for the process making the calculation). For example, and in one embodiment, n=128 can be an upper limit on certain computing platforms. In this example, other computing platforms may have a lower or higher upper limit on n. In one embodiment, each of the bins in the different sets of bins are encoded using a convolutional neural network (CNN) encoder. In this embodiment, each encoding is a representation of activation states of the bins in a given set. For example, and in one embodiment, in the case with $n^3$ bins, the activation states of all these bins can be encoded into a latent vector. Similarly, the $(n/2)^3$ or $(n/4)^3$ bins will have other encodings. In a further embodiment, the CNN encoder takes the sets of bins (602) and outputs a feature vector (e.g., an encoded activation state) that includes the features representing the input (604). Thus, the CNN encoder encodes the activation states at the different resolutions. In one embodiment, different types of CNN can be used (e.g., Convolutional layers, Max Pooling, Batch Normalization, and/or other types of CNN schemes). After combining the encoded activation states into an encoded space, the encoded space can be used to perform classification tasks. In one embodiment, a Deep Neural Network (DNN) is used to generate latent vector (606). Furthermore, the DNN uses the activated latent vector space to perform classification. In one embodiment, the output of the DNN is the class probability of a given input. This probabilistic output is used to calculate a contact quality score in a range of 0-100, where a score above 80 indicates good contact, a score below indicates bad contact, and a score in between the 20 and 80 would be neutral score suggesting that review might be warranted.

As with other neural network systems, there system iterates until a consistent value is output for the classification label. In one embodiment, the system measures an error and uses categorical cross-entropy loss to update the weight of the CNN and/or DNN until the system converges on a consistent value for the classification label.

Figure 7:
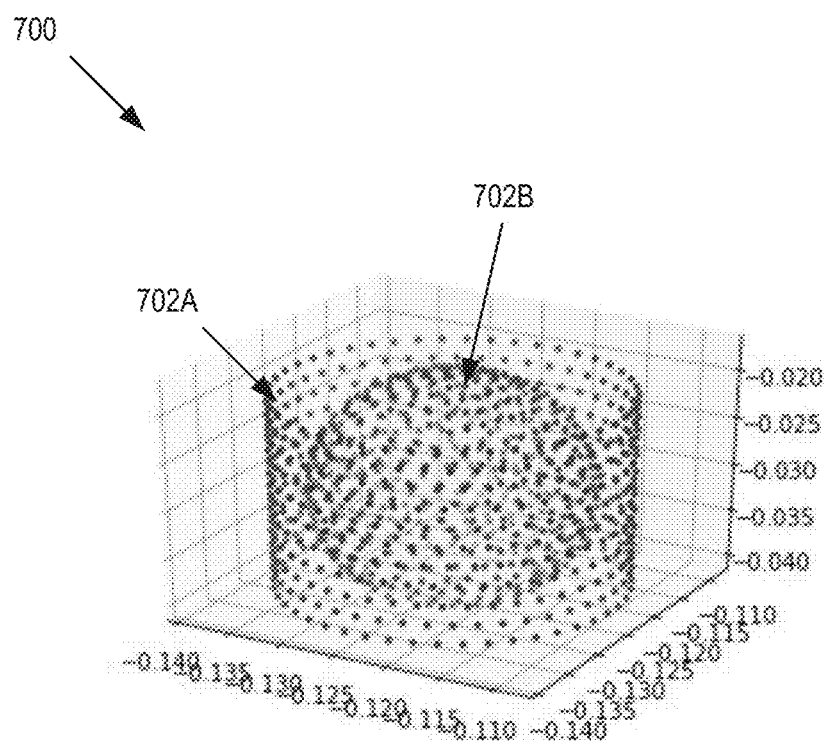
FIG. 7 is an illustration of one embodiment of a system of interacting point clouds with poor surface interaction.

In one embodiment, the machine learning classification system is trained and/or tested using a variety of different interacting 3D objects. FIG. 7 is an illustration of one embodiment of a system of interacting point clouds with poor surface interaction. In FIG. 7, a test point cloud representation 700 includes two point clouds 702A-B, where one point cloud 702A represents a tube and the other point cloud 702B represents a sphere. In one embodiment, the machine learning system computes an interaction score of $1 \times 10^{-8}$, which indicates a bad interaction. The ground truth label is a bad interaction, as there is no overlapping contact between the sphere and the inner walls of the tube.

Figure 8:
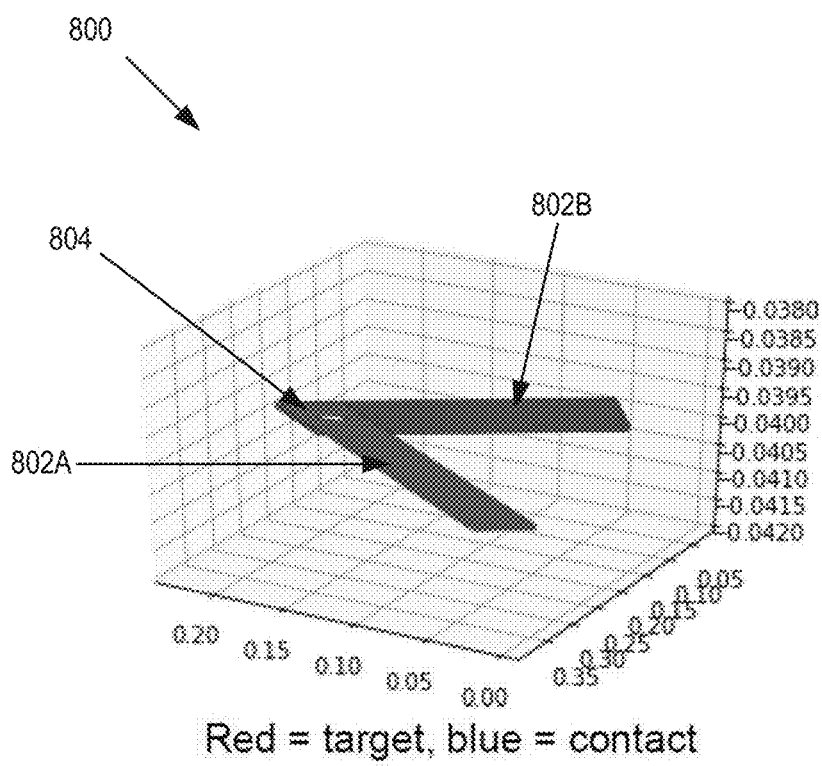
FIG. 8 is an illustration of one embodiment of a system of interacting point clouds with a neutral surface interaction.

In a further embodiment, the interactions between 3D surfaces may warrant a review. FIG. 8 is an illustration of one embodiment of a system of interacting point clouds with a neutral surface interaction. In FIG. 8, a test point cloud representation 800 includes two point clouds 802A-B, where one point cloud 802A represents a sheet overlapping the other point cloud 802B that represents another sheet, where the two sheets overlap over end portions of the two sheets. In one embodiment, the machine learning system computes an interaction score of 48.55, which indicates a neutral interaction that may necessitate a review. The ground truth label is a neutral/review interaction, because the two point clouds 802A-B are flat straight sheets that interact 804 over an end portion on each sheet.

Figure 9:
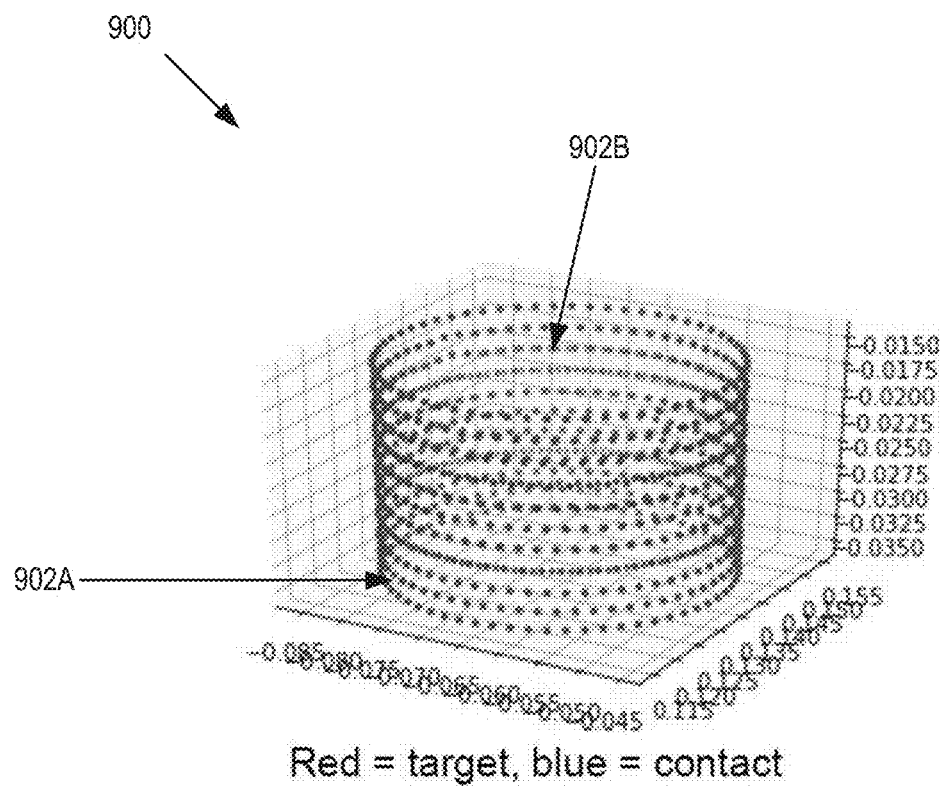
FIG. 9 is an illustration of one embodiment of a system of interacting point clouds with good surface interaction.

FIG. 9 is an illustration of one embodiment of a system of interacting point clouds with good surface interaction. In FIG. 9, a test point cloud representation 900 includes two point clouds 902A-B, where one point cloud 902A represents a tube encompassing the other point cloud 902B that represents another tube. Thus, the outer point cloud represents a tubular sleeve that fits over the inner point cloud 902B that is representing an inner tubular object. In one embodiment, the machine learning system computes an interaction score of 100, which indicates a good interaction. The ground truth label also indicates a good interaction, because the two represented object have good contact.

Figure 10:
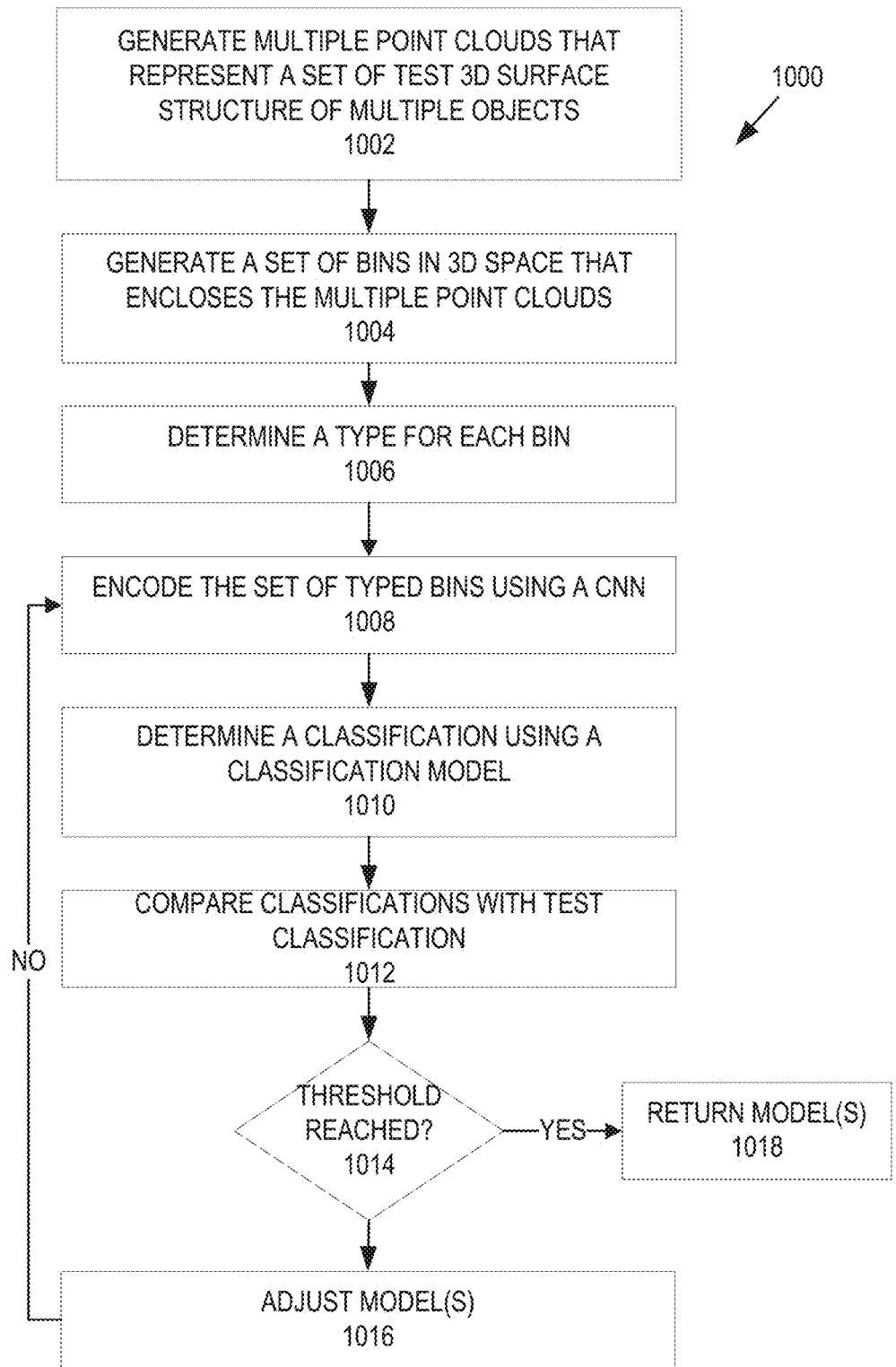
FIG. 10 is a flow diagram of one embodiment of a process to train a classification model for a set of point clouds.

In one embodiment, the classification model needs to be trained on a set of training multiple object systems. FIG. 10 is a flow diagram of one embodiment of a process 1000 to train a classification model for a set of point clouds. In FIG. 10, process 1000 begins by generating multiple points clouds that represent a set of test 3D surface structure of multiple objects for multiple test point cloud representations at block 1002. In one embodiment, each test point cloud presentation includes multiple point clouds representing interacting 3D objects. In addition, each of the 3D objects can be have a corresponding point cloud. In alternate embodiments, a point cloud can include more than one 3D object. Furthermore, there can be two or more points clouds that can represent two or more interacting 3D objects. In this embodiment, a test point cloud representation is one that includes a known result, such as a known classification label that can be used to train the model(s) described below.

At block 1004, process 1000 generates a set of bins in 3D space that encloses the multiple point clouds for each test point cloud representation. In one embodiment, process 1000 generates a set of bins at different resolutions using a multi-dimensional binning approach. In one embodiment, process 1000 can create bins numbering $(n)^3$, $(n/2)^3$, and $(n/4)^3$. In this embodiment, by having bins at different resolutions, process 1000 can capture both fine and coarse structures of the interacting 3D geometries.

At block 1006, process 1000 determines a type for each bin in each test point cloud representation. In one embodiment, process 1000 determines a type based on an occupation from one or more point clouds representing one or more 3D objects. For example and in one embodiment, for a two 3D object system, there are two point clouds. Each of the bins can have the possibility of having one or more points from point cloud A, one or more point from cloud B, two or more points from point clouds A and B, or no points from either point cloud. In this example, process 1000 could assign label to each of the bins based on this type of occupancy. In a further example, the label could be 1 for a bin with just one or more points from point cloud A, 2 for a bin with just one or more points from point cloud B, 3 for a bin with one or more points from each of points clouds A and B, and 0 for a bin with no points from either point cloud. In one embodiment, these typed bins provide an implicit representation of the proximity, overlap, and/or angle between the different surfaces of the 3D objects.

With the labels for each of the typed bins, process 1000 can encode the bins at block 1008. At block 1010, process 1000 determines a classification using a classification model for each of the test point cloud representation. In one embodiment, the classification model takes as input the encoded bins and outputs a classification label (e.g., a probability of being in a given class, a score between 0-100 or some other type of score). Process 1000 compares the generated classifications with the test classifications at block 1012. In one embodiment, for each test point cloud representation, process 1000 compares the results of the classification model with a known classification. In addition, process determines a difference between the classification model results and the known classifications. At block 1014, process 1000 determines if a threshold is reached for this training set. If the threshold is reached, process 1000 returns the model at block 1018. If the threshold is not reached, process 1000 adjusts the model(s) at block 1016. Execution proceeds to block 1008 above.

Figure 11:
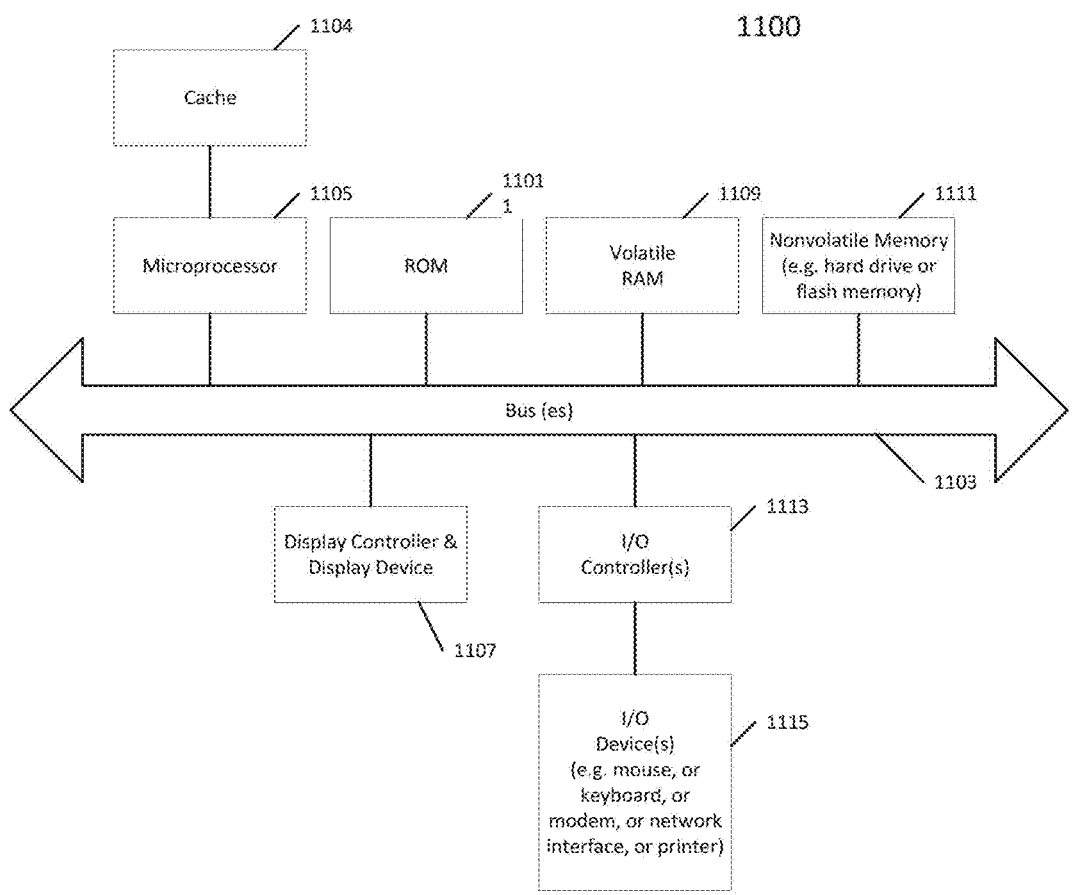
FIG. 11 illustrates one example of a typical computer system, which may be used in conjunction with the embodiments described herein.

FIG. 11 shows one example of a data processing system 1100, which may be used with one embodiment of the present invention. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may include one or more CPU(s), GPU(s), a specialized processor, and/or a combination thereof. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1117 and to peripheral devices such as input/output (I/O) devices which may be mice, keyboards, modems, network interfaces, printers and other devices which are well known in the art. Typically, the input/output devices 1115 are coupled to the system through input/output controllers 1107. The volatile RAM (Random Access Memory) 1107 is typically implemented as dynamic RAM (DRAM), which requires power continually in order to refresh or maintain the data in the memory.

The mass storage 1111 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1111 will also be a random access memory although this is not required. While FIG. 7 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "encoding," "deploying," "training," "retrieving," "generating," "confirming," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of determining spatial characteristics of three-dimensional objects, the method comprising:
   receiving a point cloud representation of a three-dimensional surface structure of a plurality of three-dimensional objects;
   generating a set of bins to represent the three-dimensional surface structure based on the point cloud representation, each bin corresponding to a spatial occupancy related to the point cloud representation, each bin including a respective type indicating a spatial relationship of the surface structures and a corresponding spatial occupancy of the bin, wherein at least one of the bins includes a type that indicates that there is an occupation of multiple ones of the three-dimensional objects in that bin;
   encoding the set of bins using a convolutional neural network; and
   determining a classification for the spatial characteristic of the surface structures based on the convolutional neural network with the encoded set of bins.

2. The method of claim 1, wherein the point cloud representation includes a plurality of point clouds.

3. The method of claim 2, wherein each of the plurality of point clouds is a set of data points in three-dimensional space and this point cloud corresponds to a surface of one of the plurality of three-dimensional objects.

4. The method of claim 2, further comprising:
   generating a respective type for each of the set of bins based on at least occupancy of one or more data points from each of the plurality of points clouds.

5. The method of claim 4, wherein, for a point cloud representation of two points clouds, a respective type can be one of a first point cloud, a second point cloud, both the first and second point clouds, and neither point cloud.

6. The method of claim 1, wherein the classification is a label.

7. The method of claim 6, wherein the label indicates one of good interaction, bad interaction, and neutral interaction.

8. The method of claim 1, wherein the set of bins are generated at a plurality of resolutions.

9. The method of claim 1, wherein each bin in the set of bins is a cube.

10. A method of training a model for determining spatial characteristics of three-dimensional objects, the method comprising:
    receiving a point cloud representation, wherein the point cloud representation representing a three-dimensional surface structure of a plurality of three-dimensional objects;
    generating a set of bins to represent the three-dimensional surface structure based on the point cloud representation, each bin corresponding to a spatial occupancy related to the point cloud representation, each bin including a respective type indicating a spatial relationship of the surface structures and a corresponding spatial occupancy of the bin, wherein the set of bins is assigned a classification label indicating a spatial characteristics of the surface structures, wherein at least one of the bins includes a type that indicates that there is an occupation of multiple ones of the three-dimensional objects in that bin; and
    training a classification model based on the set of bins and the assigned classification label, wherein the set of bins is encoded in the classification model, and wherein the classification model is trained to predict the classification label based on the set of bins for the spatial characteristics of the surface structures.

11. A non-transitory machine-readable medium having executable instructions to cause one or more processing units to perform a method of determining spatial characteristics of three-dimensional objects, the method comprising:
    receiving a point cloud representation of a three-dimensional surface structure of a plurality of three-dimensional objects;
    generating a set of bins to represent the three-dimensional surface structure based on the point cloud representation, each bin corresponding to a spatial occupancy related to the point cloud representation, each bin including a respective type indicating a spatial relationship of the surface structures and a corresponding spatial occupancy of the bin, wherein at least one of the bins includes a type that indicates that there is an occupation of multiple ones of the three-dimensional objects in that bin;
    encoding the set of bins using a convolutional neural network; and
    determining a classification for the spatial characteristic of the surface structures based on the convolutional neural network with the encoded set of bins.

12. The non-transitory machine-readable medium of claim 11, wherein the point cloud representation includes a plurality of point clouds.

13. The non-transitory machine-readable medium of claim 12, wherein each of the plurality of point clouds is a set of data points in three-dimensional space and this point cloud corresponds to one of the plurality of three-dimensional objects.

14. The non-transitory machine-readable medium of claim 12, further comprising:
    generating a respective type for each of the set of bins based on at least occupancy of one or more data points from each of the plurality of points clouds.

15. The non-transitory machine-readable medium of claim 14, wherein, for a point cloud representation of two points clouds, a respective type can be one of a first point cloud, a second point cloud, both the first and second point clouds, and neither point cloud.

16. The non-transitory machine-readable medium of claim 11, wherein the classification is a label.

17. The non-transitory machine-readable medium of claim 16, wherein the label indicates one of good interaction, bad interaction, and neutral interaction.

18. The non-transitory machine-readable medium of claim 11, wherein the set of bins are generated at a plurality of resolutions.

19. The non-transitory machine-readable medium of claim 11, wherein each bin in the set of bins is a cube.

20. A non-transitory machine-readable medium having executable instructions to cause one or more processing units to perform a method of training a model for determining spatial characteristics of three-dimensional objects, the method comprising:
    receiving a point cloud representation, wherein the point cloud representation representing a three-dimensional surface structure of a plurality of three-dimensional objects;
    generating a set of bins to represent the three-dimensional surface structure based on the point cloud representation, each bin corresponding to a spatial occupancy related to the point cloud representation, each bin including a respective type indicating a spatial relationship of the surface structures and a corresponding spatial occupancy of the bin, wherein the set of bins is assigned a classification label indicating a spatial characteristics of the surface structures, wherein at least one of the bins includes a type that indicates that there is an occupation of multiple ones of the three-dimensional objects in that bin; and training a classification model based on the set of bins and the assigned classification label, wherein the set of bins is encoded in the classification model, and wherein the classification model is trained to predict the classification label based on the set of bins for the spatial characteristics of the surface structures.

\* \* \* \* \*